Feb. 9, 1926.

P. BURKE 1,572,229

POWER SYSTEM

Filed May 11, 1925   3 Sheets-Sheet 1

Inventor
Paul Burke
by Quarles & French
Attys

Feb. 9, 1926.  
P. BURKE  
1,572,229  
POWER SYSTEM  
Filed May 11, 1925    3 Sheets-Sheet 2
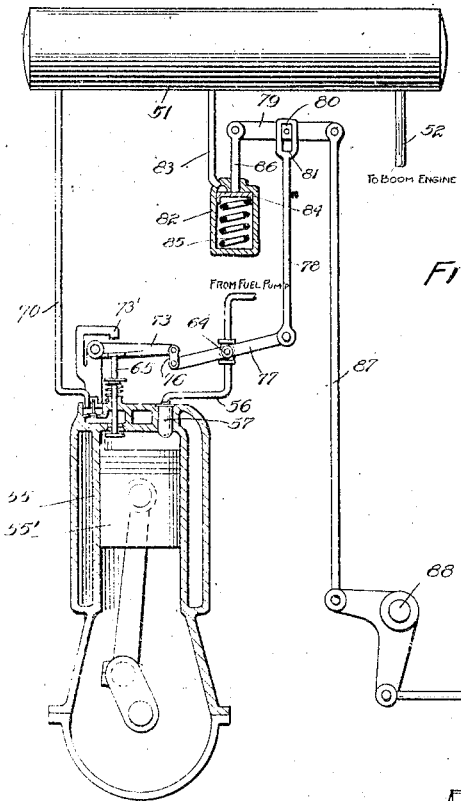
FIG. 2.
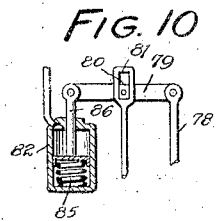
FIG. 10
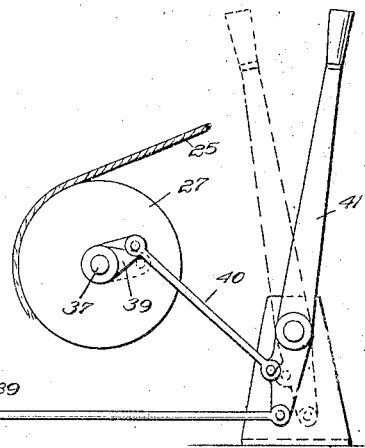
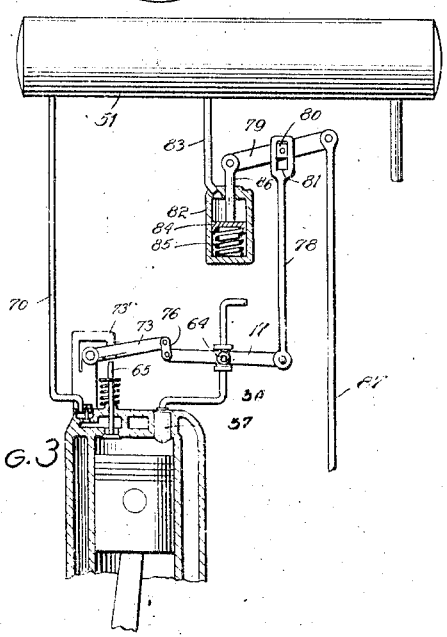
FIG. 3
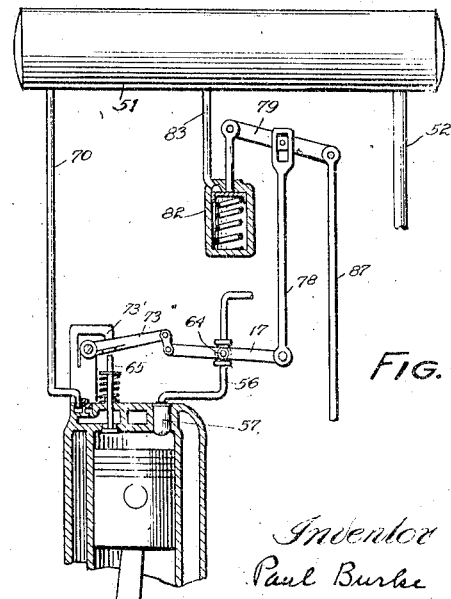
FIG. 4
Inventor  
Paul Burke  
by Quarles & French  
Attys.

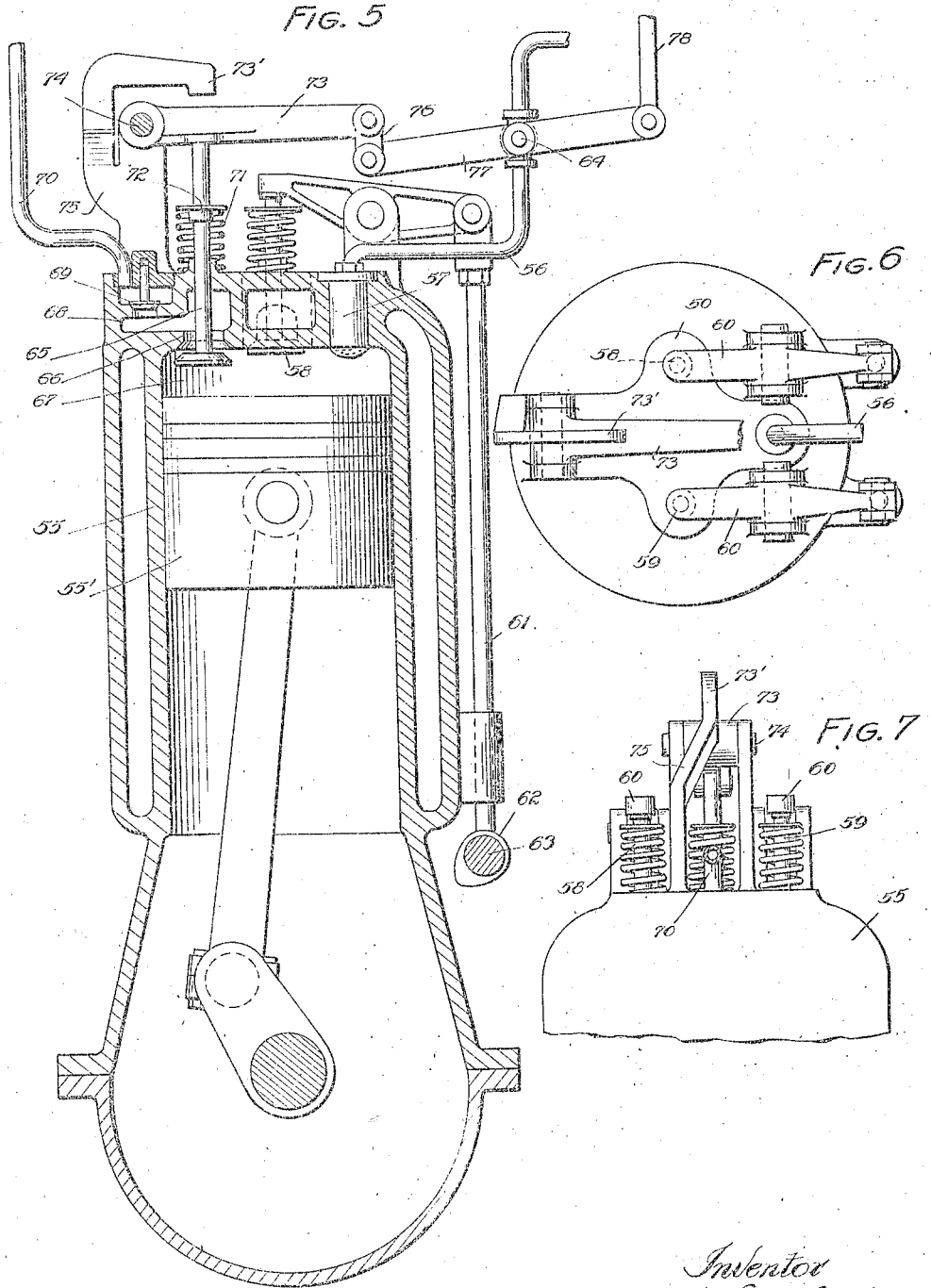

Patented Feb. 9, 1926.

1,572,229

UNITED STATES PATENT OFFICE.

PAUL BURKE, OF GREEN BAY, WISCONSIN, ASSIGNOR TO NORTHWEST ENGINEERING COMPANY, OF GREEN BAY, WISCONSIN, A CORPORATION OF WISCONSIN.

POWER SYSTEM.

Application filed May 11, 1925. Serial No. 29,597.

*To all whom it may concern:*

Be it known that I, PAUL BURKE, a citizen of the United States of America, and resident of Green Bay, in the county of Milwaukee and State of Wisconsin, have invented new and useful Improvements in Power Systems, of which the following is a description, reference being had to the accompanying drawings, wihch are a part of this specification.

The invention relates to power systems.

One of the objects of the invention is to provide a power transmission system in which one or more of the cylinders of a multicylinder internal combustion engine may be made to function intermittently as air compression cylinders, to furnish a supply of compressed air, at such times as the full power of the engine is not required, whereby auxiliary power equipment associated with the power equipment that is driven by the multicylinder internal combustion engine may be operated.

In the usual type of excavator there is generally but one system of power transmission, that is, in a steam excavator all the actuating devices are operated by steam and in an internal-combustion-engine-operated excavator all the mechanical actions are accomplished through mechanical drive from the internal combustion engine. In the case of an excavator operated by an internal combustion engine there are times in which the full power of the engine is not required for the duties being performed, as for instance, in an excavating shovel the full power is not required for the swinging of the loaded dipper, and there are times when the machine is waiting for wagons to fill, etc. In an excavating shovel also, when operated by an internal combustion engine, under some conditions of operation advantages may be obtained by providing for an additional crowd or for the quick reversal of the movement of the dipper handle, which is readily accomplished by this invention through the use of a boom engine operated by compressed air. Another object of the invention, therefore, is to provide a construction in which the main prime mover of the shovel or other excavator is a multicylinder internal combustion engine, one or more of the cylinders of which may be made to function intermittently as an air compressor to supply compressed air to a receiver from which the air may be drawn as needed for use either in a swinging engine, a boom engine, or auxiliary equipment. Preferably, when associated with an excavator the functioning of the engine as a compressor is in this invention designed to occur when the excavator is not actually engaged in digging but is engaged in some other function, such as swinging, or is at rest and waiting for wagons, etc., so that the building up of the supply of air for operating the auxiliary equipment, or as a supplemental aid to the main power equipment, is accomplished without decreasing the efficiency of the excavator under maximum power requirements.

The invention further consists in the several features hereinafter set forth and more particularly defined by claims at the conclusion hereof.

In the drawings, Fig. 1 is a side elevation view of an apparatus embodying the invention;

Fig. 2 is a detail view, partly in section, through one of the cylinders, designed to operate as a compressor, and the controls associated with it;

Figs. 3 and 4 are detail views of the apparatus shown in Fig. 2, in different positions;

Fig. 5 is an enlarged detail sectional view through one of the engine cylinders designed to operate as a compressor;

Fig. 6 is a plan view of the cylinder head of the cylinder shown in Fig. 5;

Fig. 7 is a detail side elevation view of the cylinder head;

Fig. 8 is a vertical sectional view through the digging clutch; and,

Fig. 9 is a detail plan view showing pipe connections for the boom engine.

Fig. 10 is a detail view, partly in section, showing one of the operating positions of the unloader.

Figure 1:
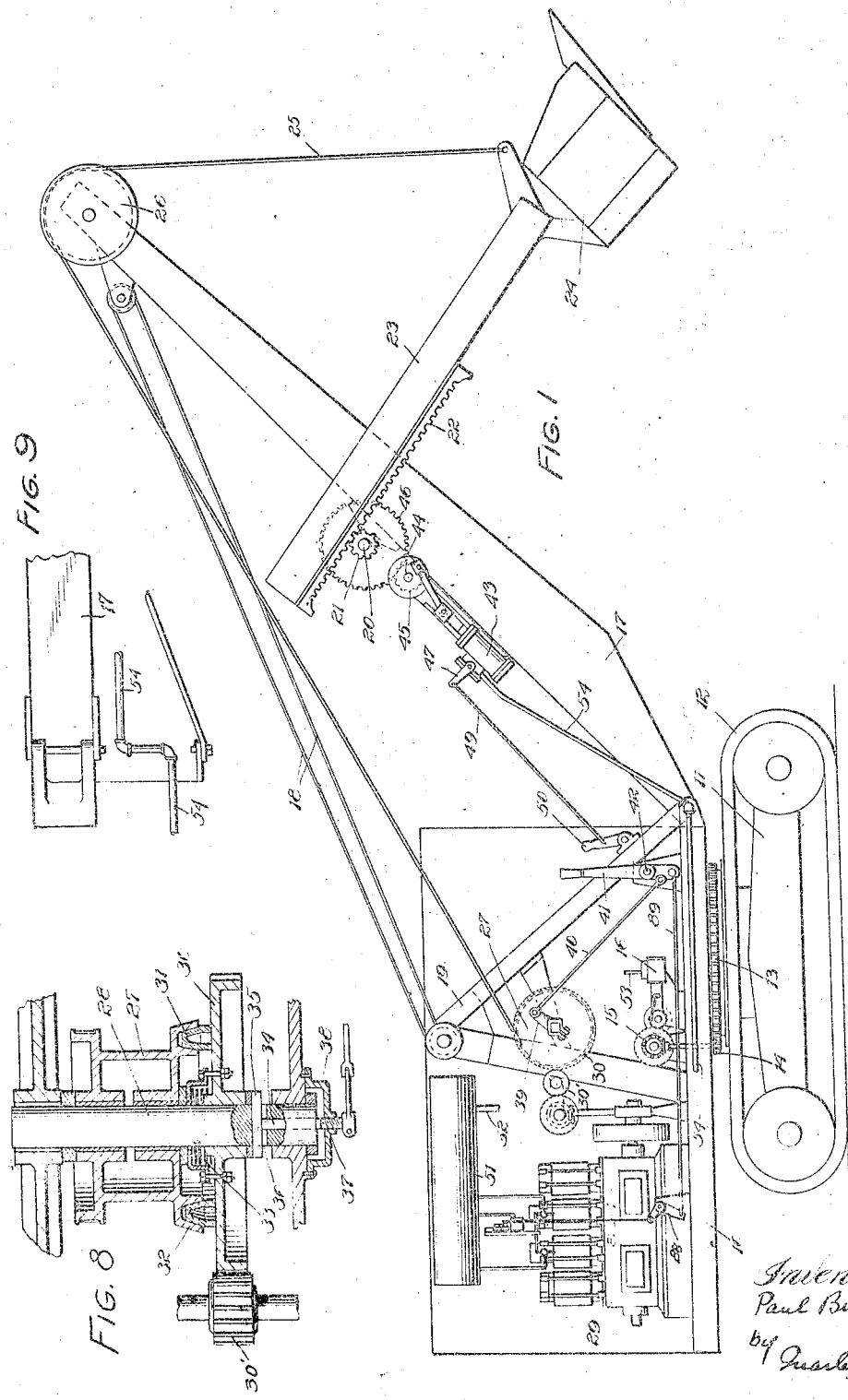

Referring to Fig. 1, I have shown an excavating shovel in which the numeral 10 designates the rotating base of the machine, 11 the traveling base, having endless propelling treads 12 thereon and upon which the rotating base 10 is mounted to revolve in any suitable and well-known manner, a ring gear 13 being generally associated with the traveling base and meshing with a gear 14 associated with the turning mechanism on the rotating base, as by means of suitable gearing connections 15 with the swinging engine 16 which, in the present instance, uses compressed air as a motive fluid. The boom 17 is pivotally mounted in the usual manner at its lower end on the front end of the rotating base and is secured in adjusted position by cables 18 connecting its outer end with the frame 19 on the rotating base, and has a shipper shaft 20 mounted thereon, in any suitable manner, carrying a pinion 21 meshing with a rack 22 on the dipper handle 23 carrying the dipper 24 at the lower end thereof. As shown, the digging rope or cable 25 is connected to the dipper and dipper handle at the lower end of the dipper handle and runs over a sheave 26 at the outer end portion of the boom, back to the drum 27 mounted on a supporting shaft 28. The drum 27 is driven from a multicylinder internal combustion engine 29 by any suitable gearing connection therewith, including gears 30 and 30 through clutch mechanism associated therewith, and in Fig. 8 I have shown a clutch construction in which the gear 30 carries a clutch face 31 designed to engage cooperative clutch faces 32 formed on the drum 27 by movement of the gear 30 relative to the shaft 28. The gear 30 is moved to a clutch-disengaged position by a spring 33 and is moved into clutch engagement with the drum 27 by means of a pin 34 extending through a bore in the shaft 28 and engageable with a thrust member 35 working in a transverse slot 36 in the shaft 28, the shaft 28 being stationary. The pin 34 is actuated by means of a thrust screw 37 mounted in a fixed boss associated with the frame of the machine, this member 37 having a crank arm 39 secured thereto operatively connected by a link 40 to one end of a control lever 41 pivotally mounted intermediate its end 42 on the frame of the machine.

With this construction, when the clutch is thrown in by the lengthwise movement of the gear 30 relative to the shaft 28, the drum 27 will be moved to wind in the rope 25 and thereby hoist the dipper to accomplish the digging operation. The rope 25 instead of being dead-ended at the dipper, as shown, may be associated with the shipper shaft 20 to aid in the outward thrust, as shown and described in my United States Letters Patent No. 1,536,609, issued May 5, 1925.

A boom engine 43 of any suitable construction is mounted on the boom 15 and operated by compressed air, and its drive shaft 44 carries a gear 45 meshing with a gear 46 on the shipper shaft 20. This boom engine is of the well-known reversible type, whereby the shipper shaft 20 may be driven in either direction so as to reciprocate the dipper handle 23 relative to the boom through the gearing connections 21 and 22. The control lever for the boom engine, designated by the numeral 47, is operatively connected by means of a link 49 with an operator's control lever 50.

In order to supply compressed air to the swinging engine 16 and the boom engine 43, one or more of the cylinders of the internal combustion engine 29 are designed to operate as compressors to furnish air to a receiver 51 connected by a pipe 52 to a pipe 53 for the swinging engine, and to a pipe 54 to the boom engine, the pipe 54 being suitably jointed, as shown in Fig. 9, in line with the hinge pin of the boom, so as to permit raising and lowering of the boom.

In Figs. 2 to 7, inclusive, I have shown one of the cylinders 55 of the engine equipped to operate as an air compressor, and having the piston 55' working therein. As shown, the engine is of a relatively high compression fuel injection type, in which fuel from a pipe 56 is introduced into a spraying device 57 and thereafter consumed in the engine during the power stroke, the engine being shown as a four cycle engine equipped with a spring-closed inlet valve 58, and a spring-closed exhaust valve 59 of the overhead type, each actuated through a rocker lever 60, a push-rod 61 associated with a cam 62 on a cam shaft 63 suitably driven from the crank shaft of the engine in a well-known manner. When these cylinders are functioning as engine cylinders their operation is not different from the usual operation of an oil engine. When, however, the cylinder is functioning as a compressor, the supply of fuel through pipe 56 is cut off by a valve 64 and a valve 65 is opened, establishing communication through a port 66 between the combustion or compression chamber 67 and a chamber 68 from which compressed air passes by a check valve 69 to a pipe 70 connected with the receiver 51. The valve 65 is normally held closed by a spring 71 interposed between the cylinder head and a stop member 72 on the valve stem, but is opened, as above described, through the outward movement of a lever 73 pivotally mounted at 74 on a bracket 75 secured to the cylinder head and connected by a link 76 with one end of a lever 77 which has the spindle of the fuel valve 64 connected intermediate its ends to turn with it so that the swinging of this lever will also act to turn the fuel valve on or off. The other end of the lever 77 is connected by a link 78 to a floating control lever 79, the connection here shown comprising a block 80 to which the control lever 79 is pivotally connected, this block working in the slotted end 81 of the link 78. One end of the lever 79 is connected with a pressure responsive mechanism or compression unloading device associated with the receiver 51 and here shown as a cylinder 82 having a pipe 83 connecting its upper end with the receiver and a piston 84 working in said cylinder and normally moved upwardly by a spring 85. A piston rod 86 connects the piston 84 with one end of the control lever 79. The other end of the lever 79 is pivotally connected by a link 87 with one arm of a bell crank lever 88, the other arm of which is connected by a link 89 with the lower end of the operator's lever 41. With this construction, when the operator moves control lever 41 from the dotted line position to the full line position shown in Fig. 2, to throw out the digging clutch, that end of the control lever 79 associated with the link 87 will be swung upwardly to the full line position shown in Fig. 2, the lever then pivoting on the piston rod 86 with the result that the lever 77 associated with the link 78 will be swung upwardly, closing off the fuel supply valve 64, and after a slight interval moving the lever 73 to engage the stem of the valve 65 to open the same against the action of the spring 71, whereby this cylinder of the engine no longer functions as an engine but functions as an air compressor, the inlet valve of the engine opening to permit the piston to draw air into the cylinder, and both inlet and exhaust valves being closed on the compression strokes so that the piston on this stroke forces air through the then open port 66 past the check valve 69 to the receiver 51, this condition being brought about preferably only during such times as the digging clutch is thrown out. Thus, the cylinder is operating as an air compressor and will continue to do so under the conditions above described until the receiver pressure reaches a predetermined maximum value at which time this higher pressure acts on the piston 84 to move it downwardly, opposed by the spring pressure 85 to the position shown in Fig. 3, with the result that the end of the lever 79, associated with the piston 84, is moved downwardly and the block 80 is lowered half of its possible vertical travel in the slot 81 and allowing valve 65 to close under the influence of its spring 71, the lever 73 meanwhile having approached its limiting stop 73' on bracket 75, and the lever 77 being also moved to open the fuel valve 64. Thus, the engine is now in a condition to function as an engine.

When the receiver pressure is low and the digging clutch is engaged, the lever 79 assumes the position shown in Fig. 4, the left hand being high and the right hand end low, the trunnion block 80 being then in the same position as shown in Fig. 3, with the result that the same effect upon the cylinder is produced, that is, it functions as an engine.

When the receiver pressure is at a maximum or high pressure and the digging clutch is engaged, the floating lever 79 assumes the position shown in Fig. 10, with both ends in lowered position so that the trunnion block 80 is also low. The slot in link 78 is of sufficient length to allow the block 80 to pass freely downward and the stop 73' acting on lever 73 and through link 76 and lever 77 prevent further downward movement of the link 78.

From the foregoing it will be noted that I have provided a power system, more particularly for an excavator, in which the multicylinder internal combustion engine may function as an engine and one or more of the cylinders of which may function as a compressor to supply air to a receiver, with control mechanism associated with the receiver, and with the control lever of the digging clutch, whereby the compression action of the engine, when functioning as a compressor, is controlled so that it ceases to function as a compressor when maximum compression conditions exist in the receiver and will be brought into action when a predetermined low pressure exists in the receiver, and where its functioning as a compressor is made available through the throwing out of the digging clutch, that is, at such times when the maximum power of the engine is not required, and where this control through the digging clutch will not act to have the engine function as a compressor if the air in the receiver itself is at a maximum or higher pressure. Thus, the engine is made to produce a stored up quantity of compressed air which is used as desired in the swinging engine 16 and in the boom engine 43, and such other power equipment as the machine may be provided with for auxiliary work. With such construction the power of the engine may be augmented at such times as necessary by the operation of the boom engine through the stored up energy of the compressed air in the receiver, and there is obviously a saving in fuel effected through the cutting out of the engine action of certain of the cylinders while operating the auxiliary equipment which would otherwise require power that would be generated by all the cylinders even running under reduced load.

While I have described this invention with particular reference to an internal combustion engine of the fuel injection type, it is to be understood that any other suitable internal combustion engine may be used and that the invention is not to be limited to the specific form or arrangement of parts herein set forth except in so far as such limitations are included in the claims or necessitated by the prior art.

What I claim as my invention is:

1. In an excavator, the combination with a multicylinder internal combustion engine constituting the main power-producing unit, of mechanism receiving power direct from said internal combustion engine, control means for said mechanism, compressor means associated with one of the cylinders of said engine whereby this cylinder may operate as a compressor, and means rendered operative when the control means renders said mechanism inoperative to cause said compressor means to function.

2. In an excavating machine, the combination with a multicylinder internal combustion engine forming the main power-producing unit of the machine, digging mechanism, actuated by said engine, and a control therefor, of means for actuating one of the cylinders of this multicylinder engine intermittently as a compressor, and means, associated with the said control of the digging mechanism, controlling the intermittent action of said cylinder as a compressor.

3. In an excavating machine, the combination with a multicylinder internal combustion engine forming the main power-producing unit of the machine, digging mechanism, actuated by said engine, and a control therefor, of means for actuating one of the cylinders of this multicylinder engine intermittently as a compressor, means, associated with the said control of the digging mechanism, controlling the intermittent action of said cylinder as a compressor, a receiver, and compressor governing means acting in conjunction with said control whereby said cylinder will not function as a compressor when a predetermined maximum pressure has been obtained in the receiver.

4. In an excavating machine, the combination with a multicylinder internal combustion engine constituting the main power unit of the machine, of digging mechanism including a dipper and dipper handle, a digging drum driven by said engine and associated with said dipper and dipper handle, a clutch for said digging drum, control means for said clutch, and a boom engine associated with the dipper and dipper handle, means, under the control of said clutch control means and associated with one of the cylinders of said engine, for causing said cylinder to function as a compressor when said digging mechanism is not being operated and preventing its functioning as an internal combustion engine cylinder, a reservoir for the compressed air delivered from said cylinder, and a connection between said reservoir and boom engine.

5. In an excavating machine the combination with a multicylinder internal combustion engine constituting the main power unit of the machine, of digging mechanism including a dipper and dipper handle, a digging drum driven by said engine and associated with said dipper and dipper handle, a clutch for said digging drum, control means for said clutch, and a boom engine associated with said dipper and dipper handle, compressor governor means, means, under the control of said governor means and said clutch control means and associated with one of the cylinders of said engine, for causing said cylinder to function as a compressor when said digging mechanism is not being operated and preventing its function as an internal combustion engine cylinder, a reservoir for the compressed air delivered from said cylinder, and a connection between said reservoir and boom engine.

6. In a machine having a multicylinder internal combustion engine as the main prime mover and of the type having its fuel supply separate from the main air admission means, the combination of a receiver in communication with one of the cylinders of said engine, a control valve controlling the passage of air from said cylinder to said receiver, a check valve preventing return of air to said cylinder, and means for cutting off the supply of fuel to said cylinder and opening said control valve whereby this cylinder functions as an air compressor.

7. In a machine having a multicylinder internal combustion engine as a main power-producing unit, and auxiliary power equipment operable with compressed air, valve mechanism associated with one of the cylinders of the engine, and means for intermittently actuating said valve mechanism to cause that cylinder provided with this mechanism to function as a compressor, a receiver associated with the cylinder acting as a compressor and furnishing compressed air to said auxiliary equipment, and means for rendering operative the control of the valve-actuating mechanism only at such times as the internal combustion engine is not subject to maximum power demands.

8. In a machine having a multicylinder internal combustion engine as the main prime mover and of the type having its fuel supply separate from the main air admission means, the combination of a receiver in communication with one of the cylinders of said engine, a control valve controlling the passage of air from said cylinder to said receiver, a check valve preventing return of air to said cylinder, a fuel cut-off valve, compressor means for closing said fuel valve and opening said control valve whereby said cylinder functions as a compressor, and operator-controlled means and compressor governing means governing the action of said compressor means.

In testimony whereof, I affix my signature.

PAUL BURKE.